(12) United States Patent
Drake et al.

(10) Patent No.: US 12,299,909 B2
(45) Date of Patent: May 13, 2025

(54) METHOD AND APPARATUS FOR HIGH RESOLUTION MEASUREMENT OF A WORKPIECE

(71) Applicant: CORNING INCORPORATED, Corning, NY (US)

(72) Inventors: Jeffrey Thomas Drake, Corning, NY (US); Russell Wayne Madara, Corning, NY (US); Brett Christopher Shelton, Corning, NY (US); Jay Katsuhiko Stearns, Corning, NY (US); Eric Daniel Treacy, Beaver Dams, NY (US); David John Worthey, Pine City, NY (US); Amanda Nicole Yoder, Christiansburg, VA (US)

(73) Assignee: Corning Incorporated, Corning, NY (US)

( * ) Notice: Subject to any disclaimer, the term of this patent is extended or adjusted under 35 U.S.C. 154(b) by 341 days.

(21) Appl. No.: 17/771,597

(22) PCT Filed: Oct. 29, 2020

(86) PCT No.: PCT/US2020/057838
§ 371 (c)(1),
(2) Date: Apr. 25, 2022

(87) PCT Pub. No.: WO2021/087029
PCT Pub. Date: May 6, 2021

(65) Prior Publication Data
US 2022/0366579 A1     Nov. 17, 2022

Related U.S. Application Data

(60) Provisional application No. 62/928,847, filed on Oct. 31, 2019.

(51) Int. Cl.
    *G06T 7/33*     (2017.01)
    *G06T 7/00*     (2017.01)
    *G06T 7/62*     (2017.01)

(52) U.S. Cl.
CPC .............. *G06T 7/33* (2017.01); *G06T 7/0004* (2013.01); *G06T 7/62* (2017.01); *G06T 2207/30164* (2013.01)

(58) Field of Classification Search
CPC ........... G06T 7/33; G06T 7/0004; G06T 7/62; G06T 2207/30164; G06T 2207/10004; H04N 23/56; H04N 23/695; H04N 23/74
See application file for complete search history.

(56) References Cited

U.S. PATENT DOCUMENTS

| | | |
|---|---|---|
| 6,408,429 B1 | 6/2002 | Marrion et al. |
| 6,749,913 B2 | 6/2004 | Watanabe et al. |

(Continued)

FOREIGN PATENT DOCUMENTS

| | | |
|---|---|---|
| CN | 102639990 A | 8/2012 |
| CN | 107209129 A | 9/2017 |

(Continued)

OTHER PUBLICATIONS

Bright Field vs. Dark Field Lighting Techniques. (Year: 2019).*

(Continued)

*Primary Examiner* — Huo Long Chen
(74) *Attorney, Agent, or Firm* — Kevin M. Able

(57) ABSTRACT

Methods and systems are described herein for inspection of a workpiece, such as a honeycomb body. The methods and systems include collecting a plurality of images of the honeycomb body, extracting measurement data from each of the plurality of images, converting the measurement data extracted from each image into a common frame of reference, and combining the measurement data together.

10 Claims, 8 Drawing Sheets

(56) References Cited

U.S. PATENT DOCUMENTS

| | | |
|---|---|---|
| 8,050,486 B2 | 11/2011 | Walton |
| 8,285,027 B2 | 10/2012 | Zoeller, III |
| 9,996,766 B2 | 6/2018 | Richard et al. |
| 10,145,805 B2 | 12/2018 | Stanford et al. |
| 2002/0001405 A1* | 1/2002 | Yonezawa ........ G01N 21/95607 382/149 |
| 2007/0114700 A1* | 5/2007 | Andrewlavage ...... B28B 11/006 264/156 |
| 2009/0009637 A1* | 1/2009 | Wada .................... H04N 23/88 348/241 |
| 2010/0238281 A1* | 9/2010 | Akao ............... G01N 21/95692 348/92 |
| 2011/0116704 A1* | 5/2011 | Zoeller, III ...... G01N 21/95692 382/141 |
| 2014/0055604 A1 | 2/2014 | Delaney |
| 2014/0247352 A1 | 9/2014 | Rathi et al. |
| 2017/0223338 A1 | 8/2017 | Kang et al. |
| 2017/0336332 A1 | 11/2017 | Stanford et al. |
| 2018/0238683 A1 | 8/2018 | Watanabe et al. |
| 2018/0322632 A1 | 11/2018 | Barnes et al. |
| 2019/0096089 A1 | 3/2019 | Jones et al. |
| 2020/0211177 A1 | 7/2020 | Madara |

FOREIGN PATENT DOCUMENTS

| | | | |
|---|---|---|---|
| CN | 107646124 A | 1/2018 | |
| CN | 108140249 A | 6/2018 | |
| CN | 109844506 A | 6/2019 | |
| CN | 110148185 A | 8/2019 | |
| EP | 2913666 A2 | 9/2015 | |
| JP | 2006-200957 A | 8/2006 | |
| JP | 2007-313741 A | 12/2007 | |
| WO | 2002/029357 A2 | 4/2002 | |
| WO | WO-2016085737 A1 * | 6/2016 | ....... G01N 21/95692 |

OTHER PUBLICATIONS

Anonymous: "Bright Field vs. Dark Field Lighting Techniques—Advanced Illumination Bright Field Illumination Technique", Sep. 5, 2019, 7 pages.
International Search Report and Written Opinion of the International Searching Authority; PCT/US2020/057838; Mailed Jan. 29, 2021; 14 Pages; European Patent Office.
Chinese Patent Application No. 202080077026.X , Office Action dated Feb. 14, 2025, 5 pages (English Translation only), Chinese Patent Office.

* cited by examiner

METHOD AND APPARATUS FOR HIGH RESOLUTION MEASUREMENT OF A WORKPIECE

CROSS REFERENCE TO RELATED APPLICATIONS

This is a national stage application under 35 U.S.C. § 371 of International Application No. PCT/US2020/057838, filed on Oct. 29, 2020, which claims the benefit of priority under 35 U.S.C § 120 of U.S. Provisional Application Ser. No. 62/928,847 filed on Oct. 31, 2019, the content of which is relied upon and incorporated herein by reference in their entireties.

BACKGROUND

Honeycomb bodies are used in a variety of applications, such as the construction of particulate filters and catalytic converters that treat unwanted components in a working fluid, such as pollutants in a combustion exhaust. The manufacture of honeycomb bodies may include inspection of the features of the bodies' honeycomb structures.

SUMMARY

Various approaches are described herein for, among other things, providing improved inspection of a honeycomb body or honeycomb extrusion die. Methods are described in which measurement data derived from multiple images of portions of a honeycomb body are first converted into a common reference frame and then combined rather than creating a composite image of the entire honeycomb body and taking measurements from the composite image. Additionally, an improved apparatus for imaging a honeycomb body is described and can be configured to reduce a pattern bias in images of the honeycomb body.

In one aspect, a method of measuring features of a workpiece is provided. The method comprises capturing a first image of a first portion of the workpiece using a camera of an imaging system; determining, from the first image, a first plurality of measurements of the first portion of the workpiece in a first frame of reference of the first image; moving at least one of the workpiece or the camera relative to the other; capturing a second image of a second portion of the workpiece using the camera, wherein the first portion and the second portion at least partially overlap and share a common feature; determining, from the second image, a second plurality of measurements of the second portion of the workpiece in a second frame of reference of the second image; identifying the common feature in the first image and in the second image, wherein the common feature has a first location in the first frame of reference and a second location in the second frame of reference; determining a spatial relationship between the first frame of reference and the second frame of reference based on a comparison of the first location to the second location; converting the first plurality of measurements, the second plurality of measurements, or both, to a common frame of reference based at least in part on the spatial relationship; and creating a set of dimensions of features of the workpiece by combining the first and second pluralities of measurements as converted to the common frame of reference.

In some embodiments, the moving comprises moving at least one of the workpiece or the camera a predefined distance and the spatial relationship between the first frame of reference and the second frame of reference is based at least in part on the predefined distance.

In some embodiments, the method further comprises determining an error in moving at least one of the workpiece or the camera relative to each other.

In some embodiments, the error is determined by comparing the predefined distance to a difference between the first and second locations in the common frame of reference. In some embodiments, the spatial relationship between the first frame of reference and the second frame of reference is based on the predefined distance and the error.

In some embodiments, the common frame of reference is the first frame of reference. In some embodiments, the common frame of reference is the second frame of reference.

In some embodiments, the common frame of reference is a third frame of reference that is different from the first frame of reference and the second frame of reference.

In some embodiments, the first and second frames of reference are both oriented with respect to a Cartesian coordinate system.

In some embodiments, the method further comprises removing duplicate measurements after combining the first plurality of measurements and the second plurality of measurements in the common frame of reference.

In some embodiments, the common feature comprises a dimension defined between two points.

In some embodiments, the workpiece is a honeycomb body defining a plurality of longitudinal cells. In some embodiments, the common feature is a centroid of a longitudinal cell of the honeycomb body.

In some embodiments, the workpiece comprises a honeycomb body and the common feature comprises a length of a wall of a longitudinal cell of the honeycomb body.

In some embodiments, the dimension comprises a distance between a first centroid of a first cell of the honeycomb body and a second centroid of a second cell of the honeycomb body.

In some embodiments, the imaging system comprises the camera, a lens, a first light source, and a second light source.

In some embodiments, the first light source is configured to provide bright field lighting, and wherein the second light source is configured to provide dark field lighting.

In some embodiments, the lens defines an optical axis, the first light source defines a first illumination axis, and the second light source defines a second illumination axis, wherein the first illumination axis is angled relative to the optical axis by an angle $\alpha$ that is in a range between 0° and 20°, and the second illumination axis is angled relative to the optical axis by an angle $\theta$ that is in a range between 70° and 90°.

In some embodiments, the first light source is a ring light and the second light source is a ring light.

In some embodiments, the workpiece is illuminated by the first light source and the second light source simultaneously while capturing the first and second images.

In some embodiments, the workpiece is stationary relative to the camera of the imaging system while capturing the first and second images.

In some embodiments, the method further comprises capturing a third image of a third portion of the workpiece, wherein the common feature is a first common feature and the third portion overlaps with and comprises a second common feature with the second image; determining, from the third image, a third plurality of measurements of the third portion of the workpiece in a third frame of reference of the third image; identifying the second common feature in the second image and in the third image, wherein the second common feature has a third location in the second frame of reference and a fourth location in the third frame of reference; comparing the third location to the fourth location and defining a second spatial relationship between the second frame of reference and the third frame of reference based on the comparing;

converting the third plurality of measurements to the common frame of reference based at least in part on the second spatial relationship; and combining the third plurality of measurements, as converted to the common frame of reference, into the set of dimensions.

In one aspect, a method of measuring features of a workpiece is provided. The method comprises providing an imaging system; capturing an image of a first portion of the workpiece, wherein the image of the first portion of the workpiece defines a frame of reference; calculating a first plurality of measurements based at least in part on the image of the first portion of the workpiece; capturing an image of a second portion of the workpiece, wherein the first portion of the workpiece and the second portion of the workpiece comprise a plurality of common features, wherein the second portion comprises at least one feature that is not included in the first portion of the workpiece; calculating a second plurality of measurements based at least in part on the image of the second portion of the workpiece, wherein at least one of the first plurality of measurements is a first reference dimension defined by the common features, wherein at least one of the second plurality of measurements is a second reference dimension defined by the common features, wherein the first reference dimension is defined by a dimension between the common features based at least in part on the image of the first portion of the workpiece and the second reference dimension is defined by the same dimension between the common features based at least in part on the image of the second portion of the workpiece; comparing the first reference dimension to the second reference dimension to calculate a transformation;

applying the transformation to the second plurality of measurements to convert the second plurality of measurements into the frame of reference; and combining the first plurality of measurements and the converted second plurality of measurements.

In another aspect, an imaging system for measuring dimensions of a workpiece is provided. The system comprises a camera configured to capture images of the workpiece; an actuator configured to move the camera relative to the workpiece or the workpiece relative to the camera; a controller in data communication with the camera and the actuator and configured to cause the imaging system to: capture a first image of a first portion of the workpiece with the camera; determine a first plurality of measurements of features of the workpiece from the first image, wherein the first plurality of measurements is defined with respect to a first frame of reference of the first image; position a field of view of the camera with respect to a second portion of the workpiece with the actuator, wherein the second portion overlaps with the first portion and comprises a common feature with the first portion; capture a second image of the second portion of the workpiece; determine a second plurality of measurements of features of the workpiece from the second image, wherein the second plurality of measurements is defined with respect to a second frame of reference of the second image; identify a first location of the common feature in the first image and a second location of the common feature in the second image; determine a spatial relationship between the first frame of reference and the second frame of reference based on a comparison of the first location to the second location; convert the first plurality of measurements, the second plurality of measurements, or both, to a common reference frame based on the spatial relationship; and create a set of dimensions of features of the workpiece by combining together the first and second pluralities of measurements as converted into the common reference frame.

In some embodiments, the actuator is configured to position the camera by moving at least one of the workpiece or the camera a predefined distance and the spatial relationship between the first frame of reference and the second frame of reference is based at least in part on the predefined distance.

In some embodiments, the controller is further configured to determine an error in movement of at least one of the workpiece or the camera relative to each other when positioning the field of view of the camera with respect to the second portion of the workpiece.

In some embodiments, the error is determined by comparing the predefined distance to a difference between the first and second locations in the common frame of reference.

In some embodiments, the spatial relationship between the first frame of reference and the second frame of reference is based on the predefined distance and the error.

In some embodiments, the common frame of reference is the first frame of reference or the second frame of reference.

In some embodiments, the common frame of reference is a third frame of reference that is different from the first frame of reference and the second frame of reference.

In some embodiments, the workpiece is a honeycomb body defining a plurality of longitudinal cells.

In some embodiments, the common feature is a centroid of a longitudinal cell of the honeycomb body.

Further embodiments are described below in the Detailed Description.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
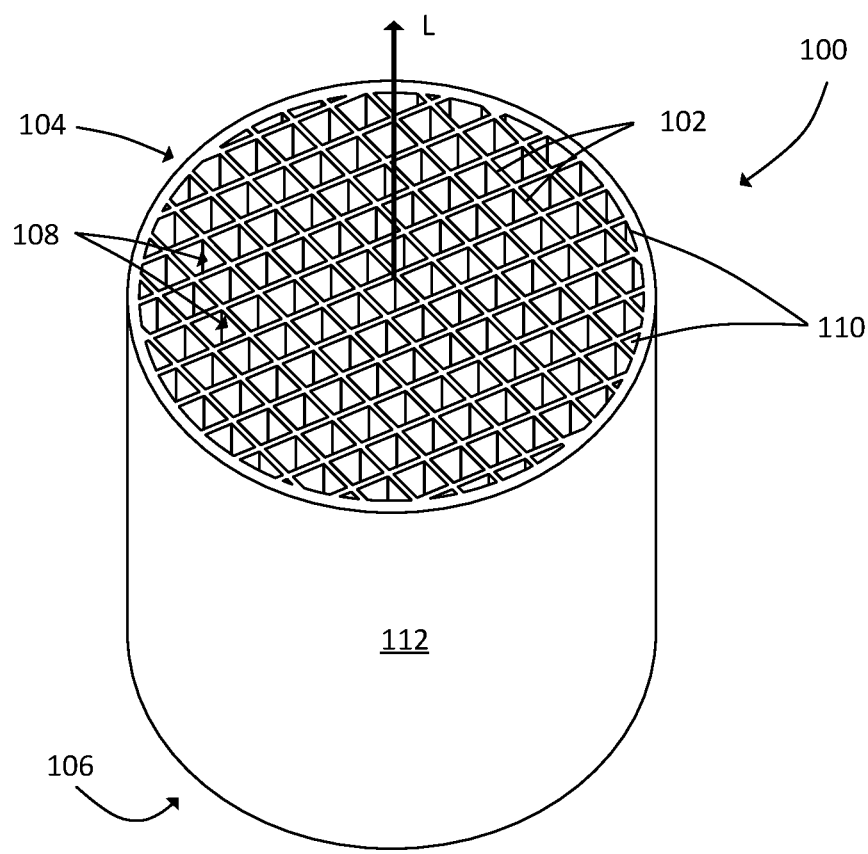
FIG. 1 is a perspective view of an example honeycomb body.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Example embodiments described herein provide improvements over known methods and systems for measuring features of honeycomb bodies. Example embodiments of the method of measuring features of a workpiece comprise capturing an image of a first portion of the workpiece, determining a first plurality of measurements based on the image of the first portion, capturing an image of a second portion of the workpiece, determining a second plurality of measurements based on the image of the second portion, locating a common feature in an overlapping region between each of the images, using the locations of the common feature in the images to convert the first plurality of measurements, the second plurality of measurements, or both, to a common frame of reference, and combining the measurements in the common frame of reference.

The improvements provide numerous advantages over known systems such as those utilizing flatbed scanner and microscope-based imaging systems. The improvements include combining measurement data together, instead of stitching together an image composite image, which reduces errors in measurement data that can arise when measurements are determined on a composite image formed by joining images together. In an example embodiment, the reduced error in the measurement data can be used to more accurately predict performance characteristics of the workpiece, such as isostatic strength. The improvements also reduce pattern bias in the images while reducing the time to capture images across an end face of a workpiece (e.g., honeycomb body or honeycomb extrusion die). In some instances, the improvements also provide higher resolution images of portions of a workpiece. Still further, the improvements are effective for workpieces that are constructed from dark and light materials and allow inspection of an entire end face of a workpiece in a shorter period of time.

Figure 2:
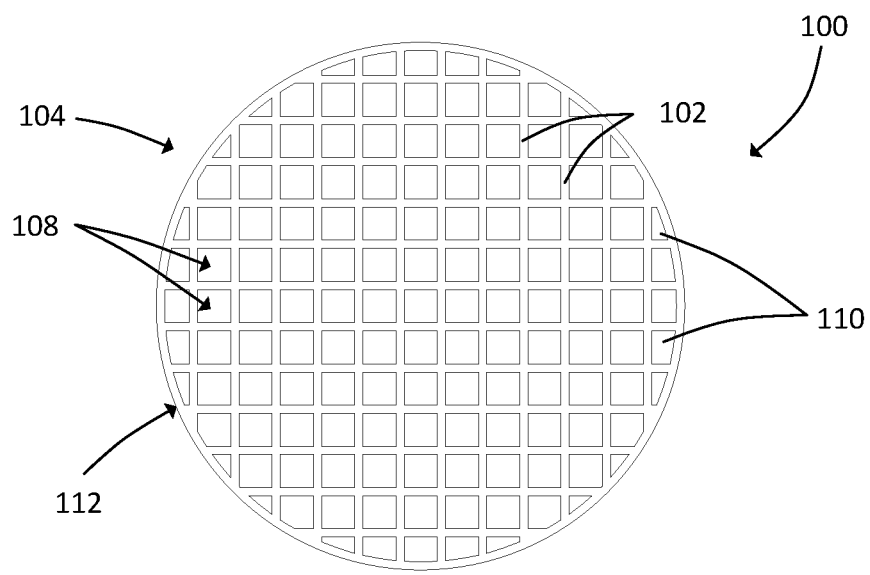
FIG. 2 is an end view of the example honeycomb body of FIG. 1.

FIGS. 1 and 2 illustrate an exemplary honeycomb body 100. The honeycomb body 100 comprises a plurality of spaced and intersecting inner walls 102, or webs, extending longitudinally through the honeycomb body 100 from a first end face 104 to a second end face 106. The inner walls 102 combine to define a plurality of channels 108, or cells, that form a cellular honeycomb structure of the honeycomb body 100. The honeycomb body 100 can also comprise peripheral channels 110 that are generally partial channels that intersect an outer skin 112 of the honeycomb body 100. As illustrated, the honeycomb body 100 comprises channels 108 having a square cross-sectional shape, but the channels 108 can have other cross-sectional shapes, such as triangular, hexagonal, octagonal, wedged, or combinations of these or other shapes. Similarly, as illustrated, the honeycomb body 100 has a circular cross-sectional shape, but other shapes can be utilized, such as rectangular, square, triangular or tri-lobed, or ellipsoidal, among others. The honeycomb body 100 defines a longitudinal axis L that extends between the first end face 104 and the second end face 106 and that is substantially parallel to a longitudinal axis of the channels 108.

The honeycomb body 100 can be formed in any desired manner, e.g., by extruding a ceramic-forming mixture through an extrusion die to form a green body, drying the green body, cutting the green body to length, and firing the green body to form a ceramic material. The ceramic material of the honeycomb body 100 can be a porous ceramic material. The honeycomb body can be inspected when green (before firing) or ceramic (after firing). The honeycomb body 100 can be utilized in a catalytic converter assembly by loading the walls 102 with a catalytic material and/or utilized in a particulate filter assembly by plugging some of the channels 108 (e.g., plugging the channels 108 alternatingly at the inlet and outlet faces).

Figure 3:
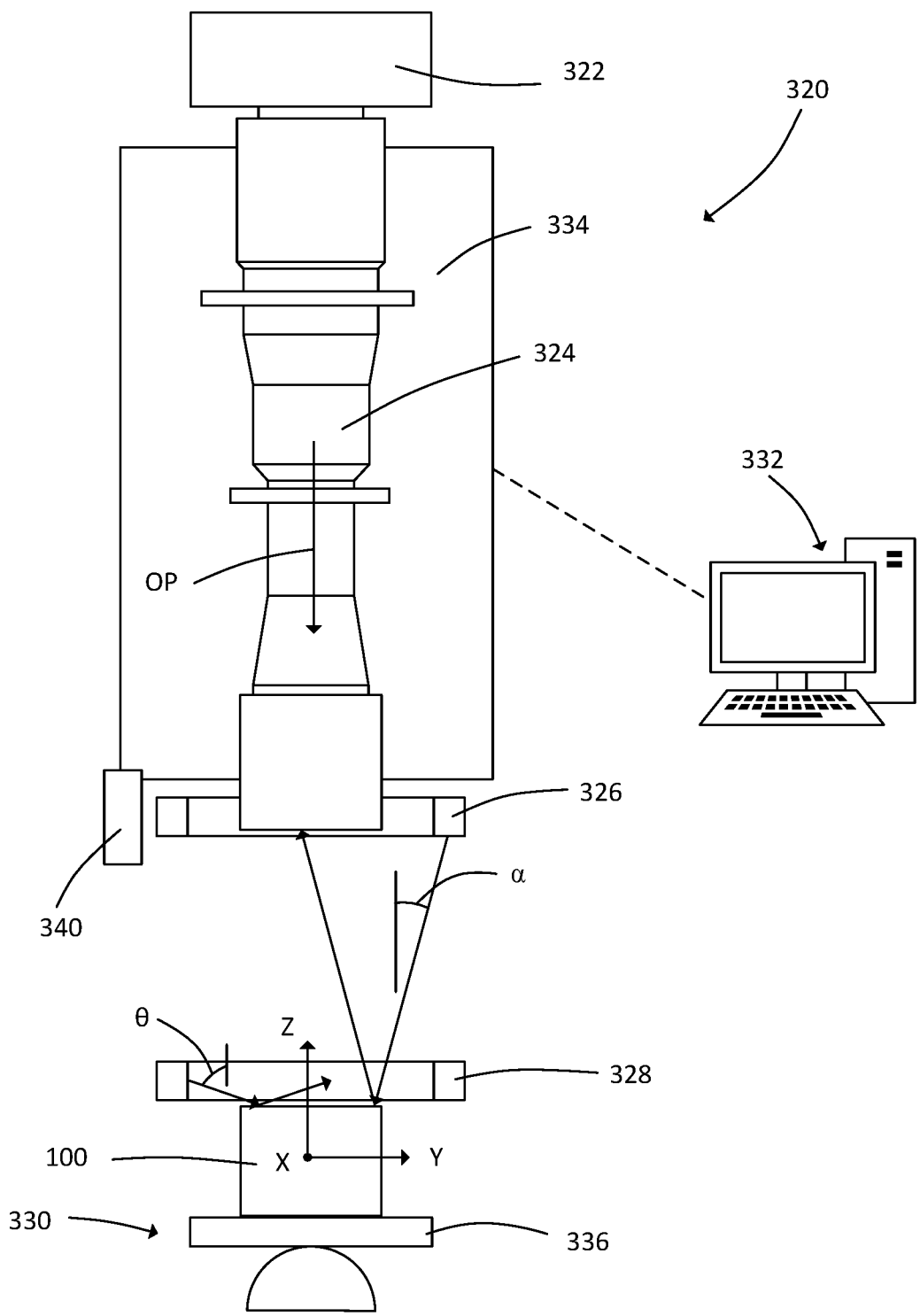
FIG. 3 is a side view of an example imaging system that can be used in accordance with embodiments disclosed herein.

Referring to FIG. 3, an example imaging system 320 that can be used to capture high-resolution images of the honeycomb body 100 will be described. The imaging system 320 can be used to capture images of portions of the honeycomb body 100 that can be analyzed using machine vision software to collect measurement data for features of the honeycomb body 100. In some embodiments, the imaging system 320 is configured to collect images of the honeycomb body 100 having resolution that is at least 5000×5000 pixels, at least 10,000×10,000 pixels, or even at least 20,000×20,000 pixels. The imaging apparatus 320 comprises a camera 322 and a lens 324. As discussed herein, the imaging apparatus 320 can also comprise a first light source 326, a second light source 328, a part holder 330, and a controller 332.

The camera 322 is disposed on a first side of the honeycomb body 100 and is configured to capture high-resolution images of an end face of the honeycomb body 100 (e.g., the inlet face 104 or the outlet face 106). The camera 322 can be a digital camera that is configured to record digital image data corresponding to the honeycomb body 100 so that measurement data of features of the honeycomb body 100 can be collected. The digital image data is based at least in part on an image of the honeycomb body 100 that passes through the lens 324 and is projected onto a digital image sensor in the camera 322. The camera 322 can be configured to collect monochromatic or multi-color image data. Exemplary digital cameras that can be employed are the Dalsa Falcon 4, 86 MP digital camera; the Prosilica GT 6600, 28.8 MP digital camera; and the Adimec S25A80, 25 MP digital camera, although other cameras are possible. In some embodiments, the camera 322 has a resolution relating to a physical dimension of the honeycomb body 100 that corresponds to approximately 4-50 µm per pixel, such as µm per pixel.

The lens 324 has an optical axis OP. The lens 324 can be integral to the camera 322 or otherwise optically coupled to the camera 322 so that an image of the honeycomb body 100 (e.g., in the form of light reflected from the honeycomb body 100) is passed through the lens 324 and directed to the camera 322, e.g., to image sensors of the camera 322. The lens 324 can provide any selected magnification to provide the desired dimensional resolution. The lens can be constructed as a telecentric or macro lens. In an example embodiment, the lens is a telecentric lens having 1× magnification, telecentricity of 0.03°, and distortion of 0.02%. Example lenses that may be employed include the TC16M036 lens offered by Opto Engineering of Houston, TX.

The imaging system can comprise a movable stage 334. The movable stage 334 can be configured to provide relative movement between the honeycomb body 100 and the camera 322, such as to move the camera 322 and lens 324 in a direction toward and away from the honeycomb body 100, such as in a direction parallel to the Z-axis illustrated in FIG. 3. The movable stage 334 can be used to provide relative movement so that a selected portion of the honeycomb body 100 is disposed within the depth of field of the lens 324. In an example embodiment, the depth of field of the lens 324 is less than 5 mm, and in another example embodiment the depth of field of the lens 324 is about 1 mm.

The first light source 326 can be disposed on the first side of the honeycomb body 100, i.e., the same side of the honeycomb body 100 as the camera 322 and the lens 324. That location enables the first light source 326 to directly illuminate the end face of the honeycomb body 100 closest to the lens 324. The first light source 326 can be disposed adjacent the lens 324 and can be coupled to the lens 324. The first light source 326 can be a high intensity monochromatic ring light that is generally annular and that circumscribes the optical axis OP (and the field of view) of the lens 324. The first light source 326 can be constructed from a plurality of light sources, such as light-emitting diodes (LED) distributed around the optical axis. In some embodiments, the light sources of the first light source 326 are selected to emit uniform monochromatic light of a selected color, such as monochromatic green light.

As shown in FIG. 3, the first light source 326 can be configured to provide direct, bright field illumination of the honeycomb body 100. In some embodiments, the first light source 326 provides bright field illumination in which an illumination axis forms a low illumination angle α with the optical axis OP of the lens 324, such as in a range between about 0° (parallel) and about 45°, or between about 0° and 20°. The low illumination angle α results in light reflecting off the end face of the honeycomb body 100 being directed back into the lens 324. In an example embodiment, the first light source 326 is constructed as a ring light, and in some embodiments the first light source 326 is coupled to the lens 324. In an example embodiment, the illumination angle α provided by light source 326 is less than 20° relative to the optical axis OP of the lens 324, in another example embodiment the illumination angle α is less than 15°, and in another example embodiment the illumination angle α is between about 10° and about 0°.

The imaging system 320 can optionally include a second light source 328 configured to provide dark field illumination of the honeycomb body 100. It was determined by the inventors that the addition of a light source providing dark field illumination could be useful in reducing a pattern bias, i.e., distortion of portions of an image of the end face of the honeycomb body 100, which was included in some images taken only with bright illumination. In some embodiments, the second light source 328 provides an illumination axis that forms a high illumination angle θ with the optical axis OP of the lens 324, such as in a range between about 45° and about 90°, or about 70° and about 90°. In some embodiments, the second light source 328 is constructed as a ring light similar to the construction of the first light source 326 but providing a different illumination angle. In an example embodiment, the illumination angle θ provided by the second light source 328 is greater than 45° or even greater than 70° relative to the optical axis OP of the lens 324, greater than 75°, or between about 75° and about 90°.

The second light source 328 can be located close to the honeycomb body 100 to provide dark field illumination. The second light source 328 can be disposed as close to the honeycomb body 100 as possible without risking impact between the honeycomb body 100 and the second light source 328 during relative movement between the honeycomb body 100 and the imaging system 320. In an example embodiment, the second light source 328 is spaced from the honeycomb body 100 by less than 10 mm, and in another example embodiment by about 6-7 mm.

The part holder 330 is configured to hold and/or position the honeycomb body 100 in a desired orientation so that selected portions of the honeycomb body 100 can be imaged. The part holder 330 comprises a movable stage 336, such as an XY stage and/or a tilt stage so that the honeycomb body 100 can be moved relative to the camera 322 and lens 324. The relative X-axis, Y-axis, and Z-axis motion between the honeycomb body 100 and the camera 322 and lens 324 can be accomplished using actuators that are coupled directly to the part holder 330, directly to the camera 322 and lens 324, or both.

The controller 332 can control the relative movement between the honeycomb body 100 and the imaging system 320, the capturing of images, the processing of the images, and the combining together of the measurement data as described herein. The controller 332 can comprise a processor, data storage, and a display. Together with the hardware components, the controller 332 can include software configured to instruct operation of the components of the imaging system 320, such as for the camera 322 to capture images or for the part holder 330 to alter the relative positions of the honeycomb body 100 and the imaging system 320. Additionally, the controller 332 can be configured to perform feature measurement by executing image measurement software. The controller 332 can also include image acquisition and processing software that provides a user interface for collecting and processing images.

In some embodiments, the imaging system 320 includes a distance sensor 340. The distance sensor 340 can be used to identify the presence or absence of the honeycomb body 100 and/or the location of the honeycomb body 100, such as by measuring the distance between the honeycomb body 100 and the lens 324. The distance between the honeycomb body 100 and the lens 324 can be used to control the movable stage 334 for the camera 322 and the lens 324, and the movable stage 338 for the honeycomb body 100 so that the honeycomb body 100 is positioned in the depth of field of the lens 324 for imaging. In some embodiments, the distance sensor 340 is a laser line profilometer.

Various physical features of the honeycomb body 100 can be measured using the imaging system 320. For example, dimensions of the walls 102 and/or of the channels 108 can be measured. In some instances, the features captured and measured using the imaging system 320 include physical imperfections, i.e., geometries (e.g., dimensions or shapes) of the honeycomb body 100 that are different than a designed geometry. For example, a wall having a break, crack, tear, or gap can be identified as an imperfection. Geometric imperfections may result during extrusion or other manufacturing processes of the honeycomb body 100 and those imperfections may alter characteristics of the honeycomb body 100, such as isostatic strength.

Figure 4:
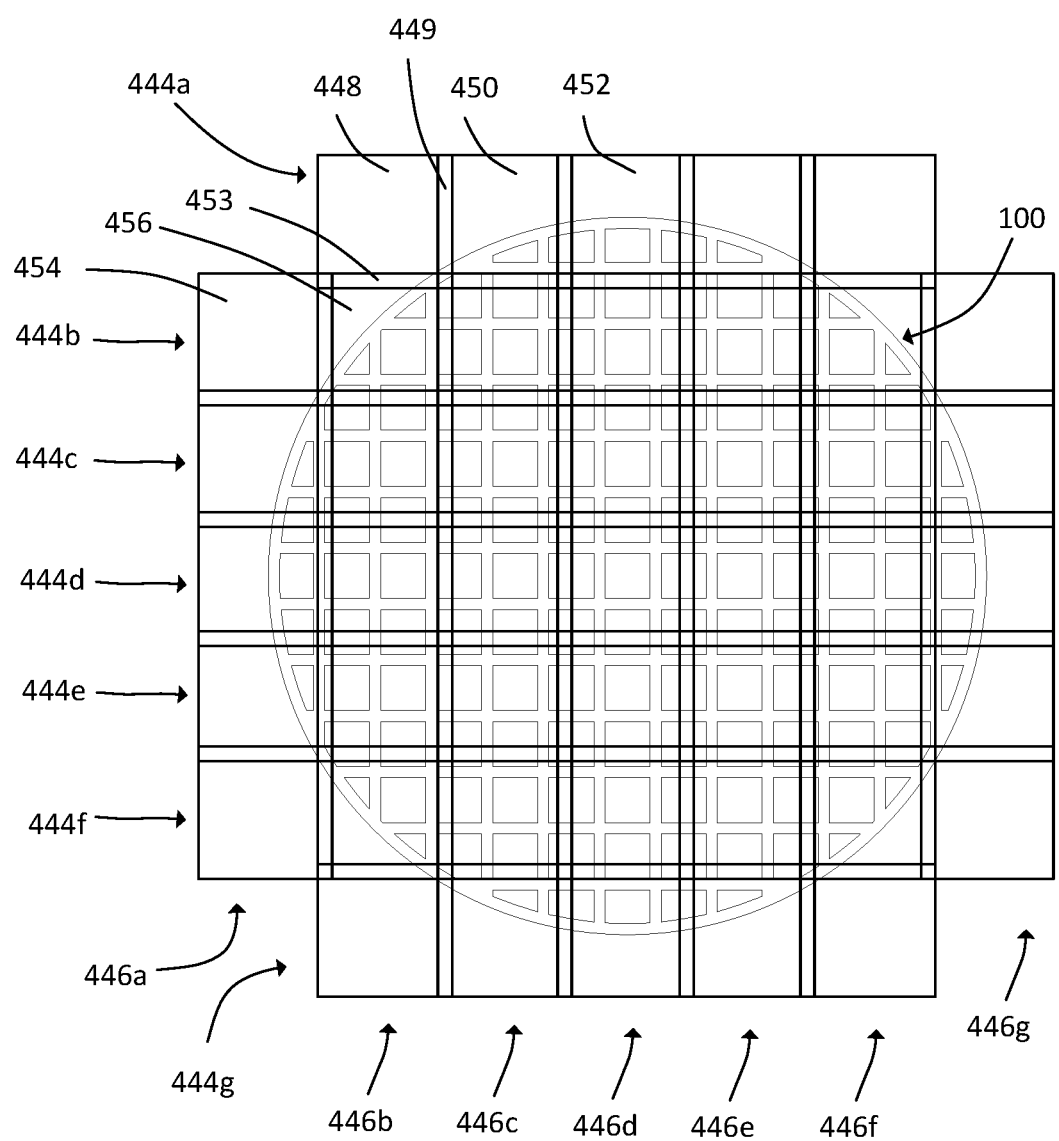
FIG. 4 is an end view of an example honeycomb body.

Referring to FIG. 4, a plurality of images are captured of the honeycomb body 100, which relate to different portions of the honeycomb body 100. The honeycomb body 100 and the imaging system 320 are moved relative to each other to image the different portions of the honeycomb body 100, and the movement can be stepped or continuous. In an example embodiment, the images are captured by stepping across the honeycomb body 100 with the imaging system 320 following a two-dimensional grid pattern oriented over an end face of the honeycomb body 100, such as the grid shown in FIG. 4. The honeycomb body 100 and imaging system 320 can be held stationary relative to each other during the capturing of each image. Capturing images along the grid pattern results in the plurality of images being arranged in rows 444a-g and columns 446a-g of images. The grid can be sized based on a particular part size, such as a diameter of a selected honeycomb body. Alternatively, the grid can have a size large enough to encompass a maximum sized honeycomb body, which allows the grid to capture images of any workpiece having a size up to the maximum.

Collecting the plurality of images over the honeycomb body 100, can result in the images having higher resolution than would otherwise be possible by the camera used to collect the images. That is, each image can be configured to capture a portion of the honeycomb body 100 instead of capturing the full honeycomb body. As a result, the full resolution of the camera can be dedicated to capturing only a portion of the honeycomb body 100 in each image.

As illustrated in FIG. 4, the grid pattern can be truncated so that the plurality of images need not include the same number of images in each row or in each column. For example, images positioned in the grid pattern that do not capture any portion of the honeycomb body 100 need not be collected.

Each captured image at least partially overlaps one or more adjacent images. Adjacent images are positioned so that the portions of the honeycomb body 100 captured in the adjacent images include at least one common feature. For example, a common feature can be a centroid of a particular one of the channels 108, a particular corner of a particular one of the channels 108, or other visually identifiable feature. As described herein, the overlap of the adjacent images, and the common feature captured by the images, provides information used to combine together measurement data gathered from the plurality of images. As will be described in greater detail below, the identified locations of the common features in adjacent images are used to determine spatial relationships between the adjacent images that are in turn used to convert measurement data determined from the adjacent images into a common frame of reference. After the measurement data is converted to a common frame of reference, the data can be combined to create a set of dimensions of features of the honeycomb body 100 without requiring the images to be stitched together.

In the embodiment of FIG. 4, the first row 444a of the images comprises five images. For ease of discussion herein, three such images are identified as a first image 448, a second image 450, and a third image 452. The first image 448 can be captured from a first relative position between the honeycomb body 100 and the imaging system 320. The second image 450 can be captured from a second relative position between the honeycomb body 100 and the imaging system 320. The third image 452 can be captured from a third relative position between the honeycomb body 100 and the imaging system 320, and so on for each successive image in each row and column. Adjacent images in the row include overlapping regions. For example, an overlapping region 449 is created between the first image 448 and the second image 450 by selecting a distance between the first relative position and the second position that is less than a width of the portion of the honeycomb body 100 depicted by the first image 448. The overlapping region 449 assures that there are common features of the honeycomb body shown in the adjacent images, i.e., identical features are shown in both the first image 448 and in the second image 450. Similarly, the second image 450 also overlaps with the third image 452 as shown by overlapping region 451. Additionally, adjacent images arranged in each column can include an overlapping region. For example, portions of the first image 448 of the first row 444a and the second image 456 of the second row 444b, which are both included in column 446b, overlap at overlapping region 453. In an example grid pattern, each image depicts a 5 mm to 50 mm square field of view, such as about a 20 mm to 30 mm square field of view, with a step size between images that is between about 50% to 90% of the width of the field of view. For example, in one embodiment, a step size of about 15 mm is utilized for an image size of about 20 mm to 25 mm, thereby creating about 5 mm to 10 mm of overlap between adjacent images.

The measurement data generated for each image can include image identifying measurements and cell attribute measurements. The image identifying measurements can include an image X index (i.e., an x-coordinate for a known location of the image, such as the x-coordinate of a centroid of the image) and/or an image Y index (i.e., an y-coordinate for a known location of the image, such as the y-coordinate of the centroid of the image). By use of the X and Y indexes, the relative position of the images with respect to each other can be established. For example, referring to the example of FIG. 4, the X index can be correlated to the column, while the Y index can be correlated to the row in which each image is in. With knowledge of the relative positions, e.g., row and column, adjacency between the images can also be determined.

The cell attribute measurements can include cell wall angle, horizontal and vertical cell pitch, horizontal and vertical wall thickness, and horizontal and vertical wall bow, shear angles, web distortion, cell area and aspect ratio, perimeter length, etc. The measurement data can be extracted from the images using machine vision software executed by one or more processors (e.g., the processor included in controller 332). An example of a system and method of extracting dimensional data from images is described in U.S. Pat. No. 8,285,027 to Zoeller, III, issued on Oct. 9, 2012 and in U.S. Pat. No. 9,996,766 to Richard et al., issued on Jun. 12, 2018, which are hereby incorporated by reference in their entireties. The one or more processors can be incorporated into the imaging system or they can be separate processors communicating over a network. In an example, a computer vision library, such as OpenCV, can be employed.

Thus, as described above, measurement data can be gathered of various features (e.g., dimension data of the cells 108 and/or walls 102 of the honeycomb body 100) captured in each of the various images. Advantageously, the system 320 enables the measurement data to be combined into a common data set even though portions of the measurement data is extracted from a plurality of different images. In particular, the system 320 enables the combination of such measurement data even if error is introduced during moving the camera or honeycomb body between capturing subsequent images. Furthermore, as described herein, the system 320 can create such a combined measurement data set without the need to stitch together all of the images into a single composite image. Advantageously, avoiding the need to stitch together images significantly reduces the computational time and resources necessary to extract measurement data from captured images while maintaining the images to be analyzed at a pixel resolution that is not otherwise feasible.

Figure 5A:
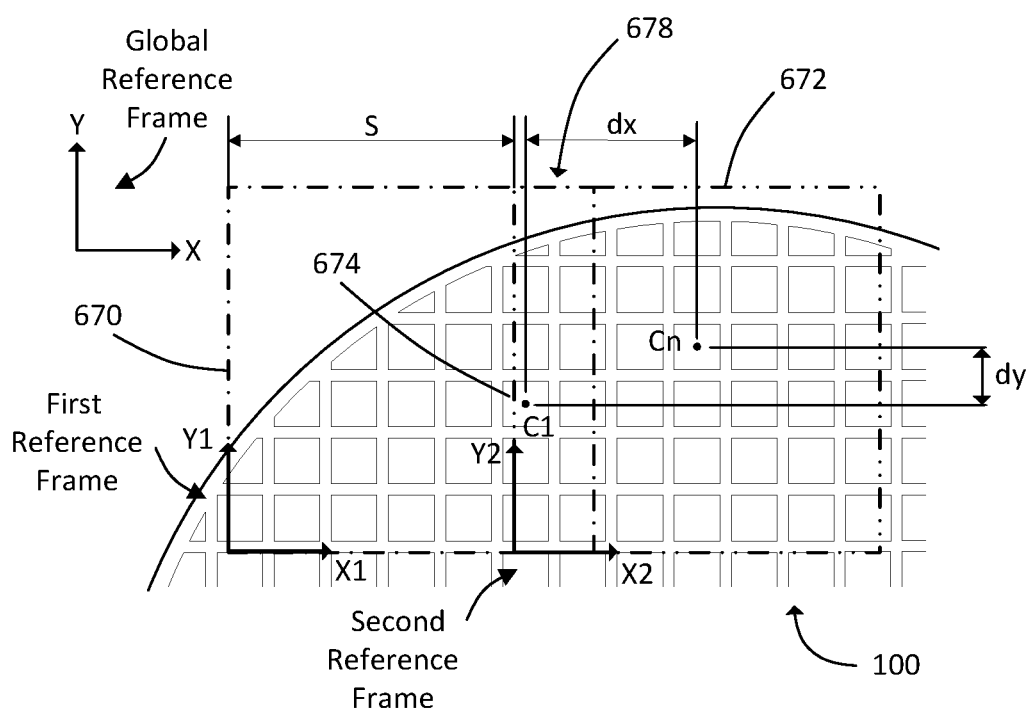
FIGS. 5A-5C are end views of portions of an example honeycomb body.
Figure 5B:
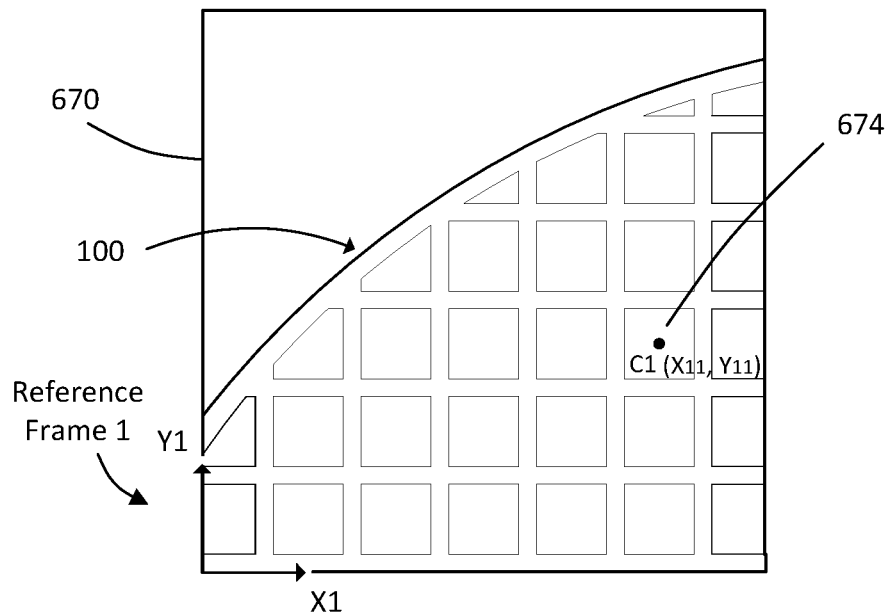
Figure 5C:
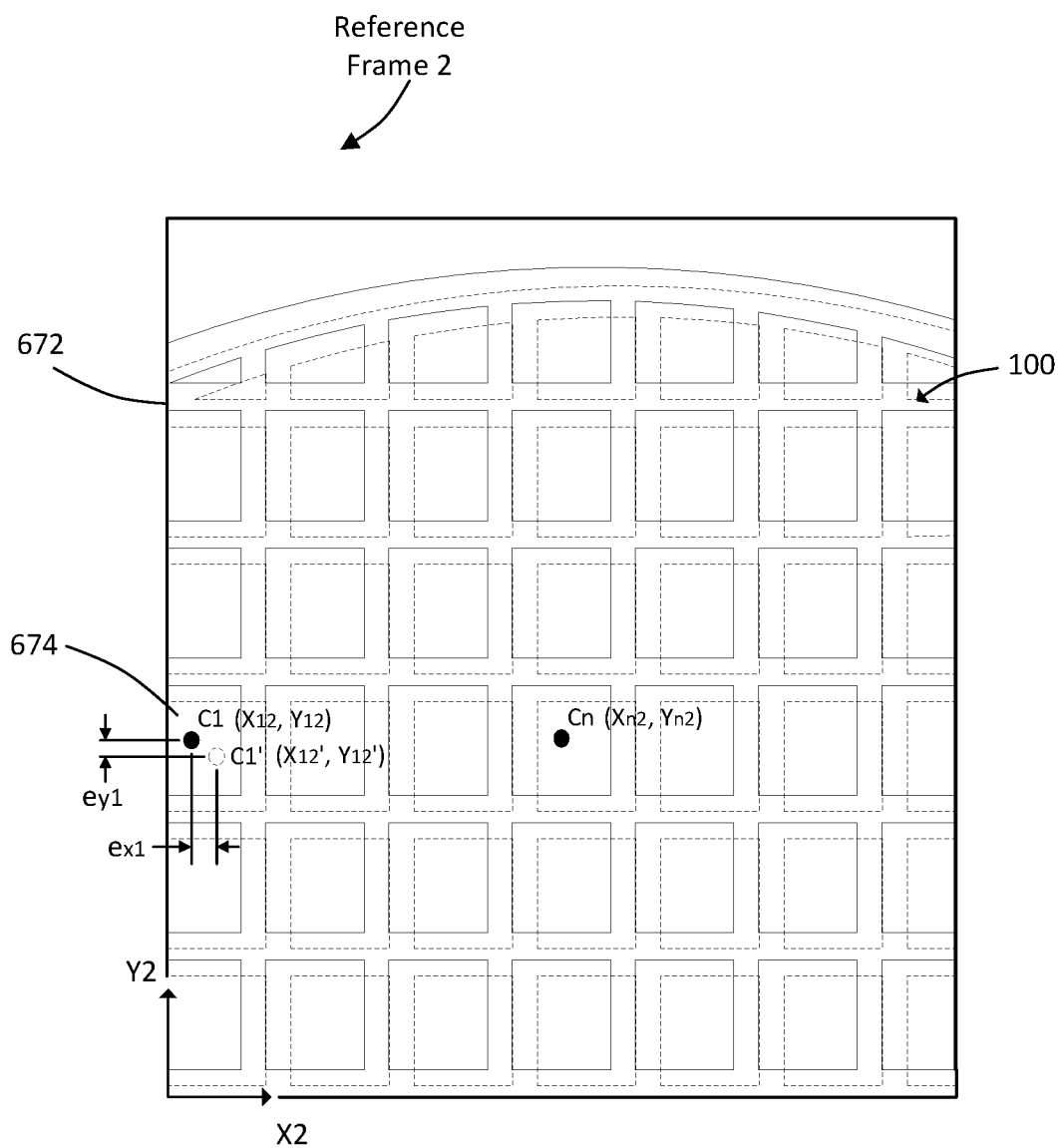

Referring to FIGS. 5A-5C, further details of operation of the imaging system 320 can be appreciated. As described above, the honeycomb body 100 is imaged by capturing a plurality of images, such as a first image 670 and a second image 672 (e.g., akin to images 448 and 450 described with respect to FIG. 4). For clarity, the field of view of the first image 670 are indicated in a dash-dot line (-.-.-), while the field of view of the second image 672 are indicated in a dash-double dot line (-. .-. ..-) The first and second images 670 and 672 are adjacently located, and share an overlapping region 678 (e.g., akin to the overlapping region 449 of FIG. 4). The features, e.g., physical structures or geometries, in the portions of the honeycomb body 100 that is depicted in the overlapping region 678 are thus common to both first image 670 and second image 672 (and also in common to the respective first portion and second portion of the honeycomb body 100 that are depicted by first image 670 and second image 672).

In the example of FIGS. 5A-5C, a centroid C1 of a first cell 674 is located in the overlapping region 678 and thus can be used as a common feature for both first image 670 and second image 672. That is, both the first image 670 and the second image 672 depict the centroid C1 of the first cell 674, so that the centroid C1 can be identified in each of the first image 670 and the second image 672. By controlling and monitoring of the status of the movable stages 334 and 336, the position of the honeycomb body 100 relative to the camera 322 (and/or lens 324) when each of the first image 670 and the second image 672 is captured is known, e.g., with respect to a global reference frame, as indicated in FIG. 5A. The global reference can be utilized to determine the positioning of the images relative to each other, e.g., the X- and Y-indexes as discussed above. For example, referring also to the example of FIG. 5, the global reference frame can be the frame in which the rows and columns are determined. Thus, the camera 322 and/or the honeycomb body 100 can be stepped in predetermined amounts relative to the other (i.e., the step size as described above) in the X- and/or Y-directions of the global reference frame to successively capture each image.

As described in more detail below, while the position of the camera 322 (and/or lens 324) relative to the honeycomb body 100 is referred to above as "known", there may be some degree of uncertainty or error in the accuracy of this position. Accordingly, each captured image can have a frame of reference that is separate from the global frame of reference, e.g., the first image 670 has a first frame of reference and the second image 672 has a second frame of reference in FIG. 5A. The frames of reference can use the same coordinate system (e.g., X- and Y-axes) and orientation as the global reference frame (e.g., the X- and Y-axes of the first and second frames of reference of the first and second images 670 and 672 can be parallel respectively to the X- and Y-axes of the global frame of reference). For consistency, the frames of reference of the images can be set at the same location relative to each image, for example, in the bottom left of each image with respect to the orientation of FIGS. 5A-5C.

Accordingly, the centroid C1 is positioned at a first location, having first coordinates $(X_{11}, Y_{11})$ within the first frame of reference defined by the first image 670 as shown in FIG. 5B. As used herein a coordinate Xnm is used to denote an X-axis coordinate of a feature "n" in the "m" frame of reference. Thus, $X_{11}$ indicates a first common feature (e.g., the centroid C1) in a first frame of reference, while $X_{12}$ indicates the first common feature (e.g., the centroid C1) in a second frame of reference. Thus, after moving the camera 322 relative to the honeycomb body 100 to capture the second image 672, the same centroid C1 is also positioned at a second location, having second coordinates $(X_{12}, Y_{12})$, within the second frame of reference defined by the second image 672, as shown in FIG. 5C. For example, with respect to FIG. 5A, the first position is toward the right hand side with respect to the first frame of reference of first image 670, while the second position is toward the far left hand side with respect to the second frame of reference of second image 672. In other words, the value of the coordinate $X_{11}$ is expected to be larger than the value of the coordinate $X_{12}$, since these coordinates are determined with respect to their corresponding frames of reference, not with respect to the global frame of reference.

Referring to FIG. 5A, if the relative positioning of the honeycomb body 100 relative to the camera 322 (and/or lens 324) presents no movement error between capturing the first and second images, then the field of view of the first image 670 is shifted relative to the field of view of the second image 672 by an expected distance S in the global reference frame. That is, the expected distance S represents the step size that the controller 332 instructs the movable stages 334 and/or 336 to undertake. Accordingly, if there is no error in movement, and if the size of the field of view is unchanged, then the second coordinates $(X_{12}, Y_{12})$ in the second frame of reference can be derived by subtracting the expected distance (e.g., distance S) from the first coordinates $(X_{11}, Y_{11})$ of centroid C1. In the illustrated example, the second image 672 is offset in only the X-direction relative to the first image 670 (i.e., the first image 670 and second image 672 are in the same row, and thus, the Y-index or coordinate in the global reference frame should be the same). Accordingly, measurements, e.g., the coordinates of the centroid C1, determined in one frame of reference can be converted (assuming no error) into the other frame of reference based at least in part on the distance S according to the following coordinate relationships:

If adjacency between first image and second image is in X-direction with step size S:

$$X_{12}=X_{11}-S; \text{ and} \quad (1)$$

$$Y_{12}=Y_{11}. \quad (2)$$

If adjacency between first image and second image is in Y-direction with step size of S:

$$X_{12}=X_{11}; \text{ and} \quad (3)$$

$$Y_{12}=Y_{11}S. \quad (4)$$

Based on those relationships, the coordinates of every measured feature from either of the first image 670 and the second image 672 can be converted into either frame of reference. For example, coordinates measured in the first frame of reference, defined by the first image 670, can be converted to coordinates in the second frame of reference, defined by the second image 672, by subtracting the distance S to each X-coordinate, while the Y-coordinate remains unchanged. Thus, this conversation enables either the first frame of reference or the second frame of reference to be used as a common frame of reference. Measurements corresponding to other features of the honeycomb body 100 can also be converted into a common frame of reference in a similar way. For example, a centroid Cn of a cell "n" that is depicted in the second image has coordinates in the second frame of reference ($X_{n2}$, $Y_{n2}$) that can be converted into coordinates in the first frame of reference. When each of the desired measurements has been converted to a common frame of reference, they can be combined into a single common measurement data set, without requiring a combination of the image data of the plurality of images.

Measurements of other features shown in the second image 672 can also be determined relative to the common feature in the second image 672. In particular, measurements of features that are only shown in the second image 672 can be combined together with features only shown in other images by relating them to the common feature. For example, measurements such as coordinates of the centroid Cn that is only shown in the second image 672 can be determined. Within the second image 672, the common feature, centroid C1, and the centroid Cn are spaced from each other in the X-direction by a distance dx and in the Y-direction by a distance dy, resulting in the coordinates having following relationships:

$$X_{n2}=X_{12}+dx; \text{ and} \tag{5}$$

$$Y_{n2}=Y_{12}+dy. \tag{6}$$

When multiple measurements determined from multiple images are converted into a common frame of reference, the measurements can be combined together into a single common measurement data set.

Although the described example includes a second image 672 that is translated only in the X direction relative to the first image 670 by distance S, the images can be offset in either, or both, the X and Y directions and the coordinate relationships altered accordingly. For example, combining measurement data from a plurality of images in a grid pattern, such as that shown in FIG. 4, requires applying different spatial relationships for each image relative to a common frame of reference.

Additional images can be captured and measurements collected from the image. Measurement data generated from subsequent images can be converted into the common frame of reference using the conversions from intervening adjacent images. For example, measurements generated from a third image that is spaced from the first image 670 so that they do not include any overlapping region, can be converted into a common frame of reference by combining the conversion of measurements between the first image 670 and the second image 672, and the conversion of measurements between the second image 672 and the third image.

In another example, the measurements can be converted to a common frame of reference after determining and/or correcting for a positioning error. For example, the positioning error can be determined by comparing an expected location of a common feature in a given frame of reference to an actual location of the common feature in that frame of reference. For example, as described above, it is expected that $X_{12}=X_{11}-S$ and $Y_{12}=Y_{11}$ in the example described above. However, the error between the expected location and the actual location can be introduced when moving the camera 322 and honeycomb body 100 relative to each other between the capture of each successive image. For example, the second location of the centroid C1 can be in a position within the second image 672 that is different than the expected second location, as shown by the dashed lines in FIG. 5C. In particular, the actual second location is illustrated as C1' and has coordinates ($X_{12'}$, $Y_{12'}$), while the expected second location has coordinates ($X_{12}$, $Y_{12}$). In the illustrated example, the error in the relative positioning results in an X-coordinate error ($e_{x1}$) and a Y-coordinate error ($e_{y1}$), and the coordinates can be converted using the following relationships:

If adjacency between first image and second image is in X-direction with step size of S:

$$X_{12'}=X_{11}-S+e_{x1}; \text{ and} \tag{7}$$

$$Y_{12'}=Y_{11}+e_{y1}. \tag{8}$$

If adjacency between first image and second image is in Y-direction with step size of S:

$$X_{12'}=X_{11}+e_{x1}; \text{ and} \tag{9}$$

$$Y_{12'}=Y_{11}-S+e_{y1}. \tag{10}$$

Based on those relationships, the coordinates of every measured feature from the second image 672 can be more accurately converted from coordinates in the second frame of reference, defined by the second image 672, to coordinates in the first frame of reference, defined by the first image 670, by adjusting each X-coordinate by distance S and the error in the X-axis, while adjusting the Y-coordinates by the error in the Y-axis.

Figure 6A:
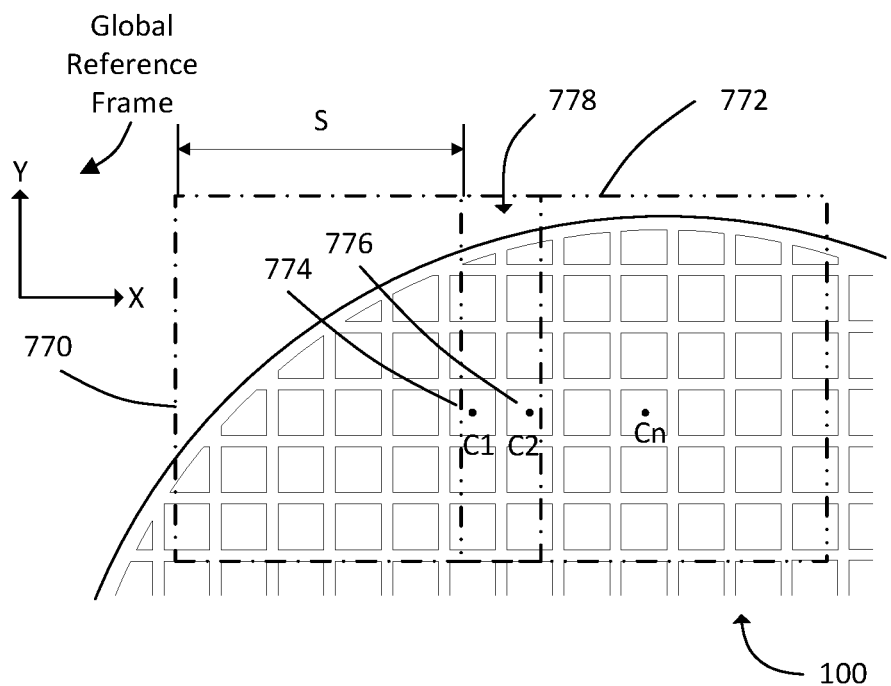
FIGS. 6A-6C are end views of portions of an example honeycomb body.
Figure 6B:
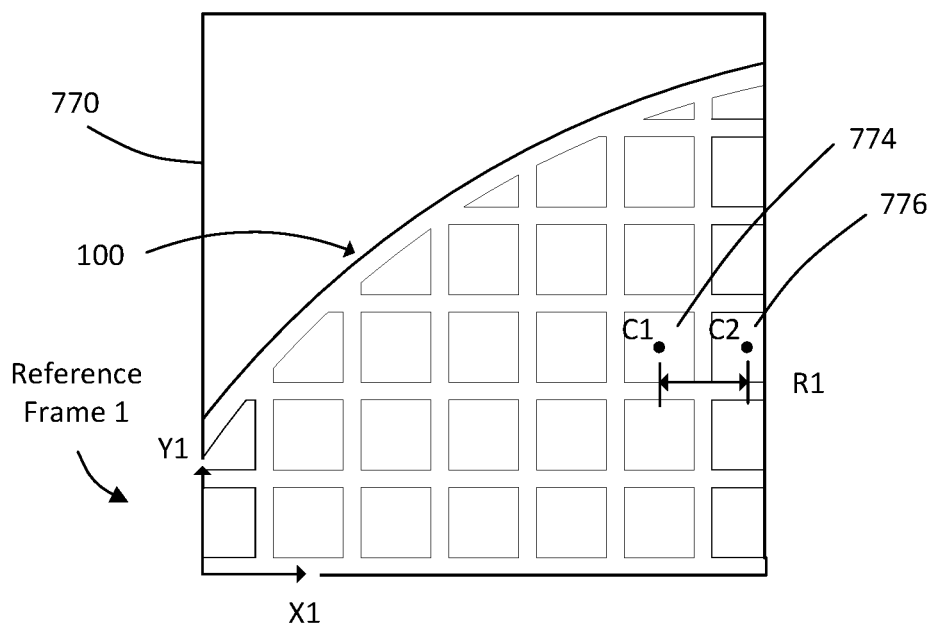
Figure 6C:
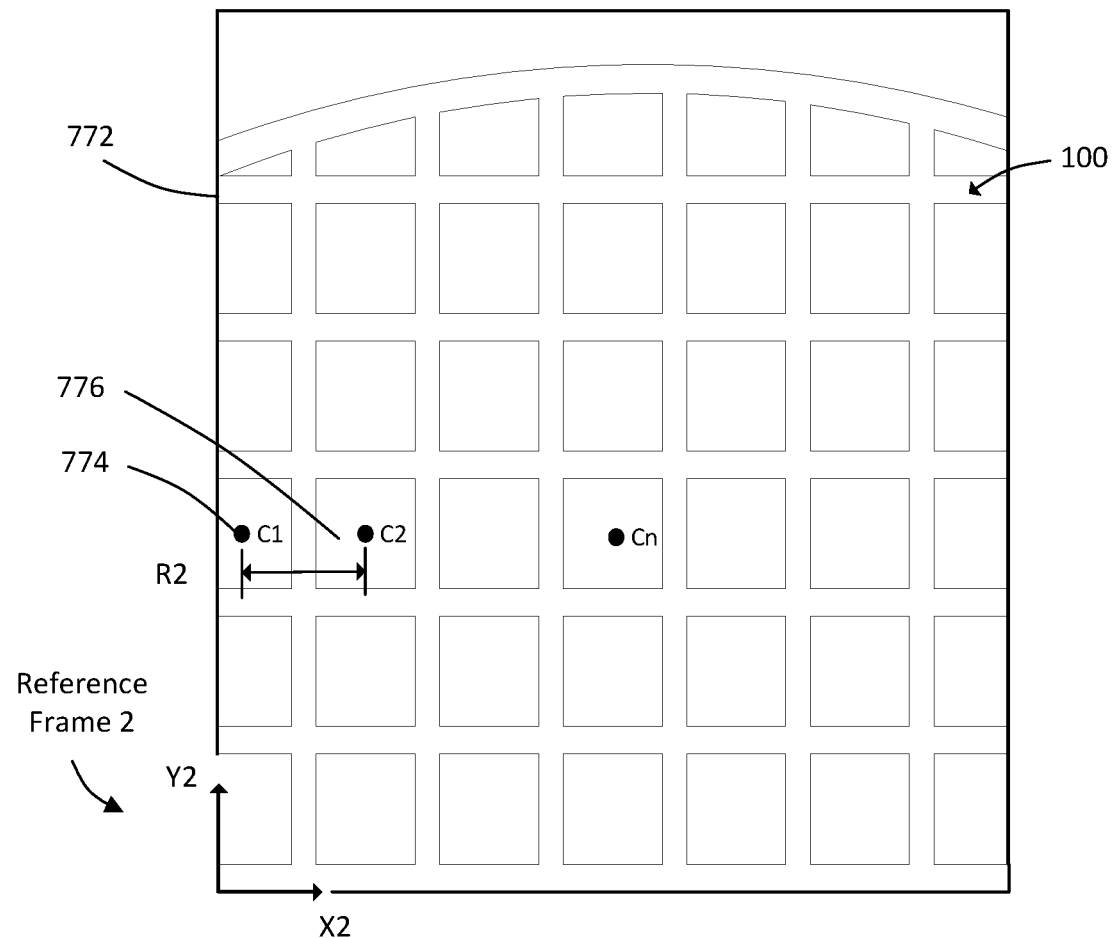

Referring to FIGS. 6A-6C a plurality of common features shown in an overlapping region can also be used to determine any scaling error (change in the size of the field of view of the lens 324 when capturing different images) before combining the measurement data. The first image 770 depicts a first portion of the honeycomb body 100 that includes a first feature, e.g., the centroid C1 of the first cell 774, and a second feature, e.g., a centroid C2 of a second cell 776. The second image 772 depicts a second portion of the honeycomb body 100 and includes at least a portion of the first portion of the honeycomb body 100 to define an overlapping region 778. The first image 770 and the second image 772 are sized and oriented so that the overlapping region 778 includes the centroid C1 of the first cell 774 and the centroid C2 of the second cell 776. As a result, both the first image 770 and the second image 772 depict the centroid C1 of the first cell 774 and the centroid C2 of the second cell 776.

The centroids provide common features in the first image 770 and the second image 772. A dimension, such as a distance between the centroids, that can be measured in the first image 770 and the second image 772 can be used to normalize the measurement data generated from the images to assure that the images depict the portions of the honeycomb body 100 at the same scale or magnification. For example, generating measurement data from the images can include generating a distance between centroid C1 and centroid C2 based on the first image 770 and a distance between centroid C1 and centroid C2 based on the second image 772. The distance between centroid C1 and centroid C2 extracted from the first image 770 defines a first reference dimension R1, shown in FIG. 6B. The distance between centroid C1 and centroid C2 extracted from the second image 772 defines a second reference dimension R2, shown in FIG. 6C. The first reference dimension R1 is compared to the second reference dimension R2 to calculate a scaling error. Which can be applied to measurement data from the measurement data taken from the plurality of images to normalize all of the measurement data before it is combined into common measurement data set.

Next, combining the data comprises combining the measurement data into a single common measurement data set. For example, the measurement data extracted from the baseline image and the converted measurement data extracted from subsequent images are combined into a single set of measurement data for the entire honeycomb body 100. The step of combining the measurement data can also include removing duplicative measurement data resulting from measurements extracted from overlapping regions of the images. As a result, a single set of measurement data is created that reduces errors caused by imaging and that is free of duplicative measurement data.

Figure 7:
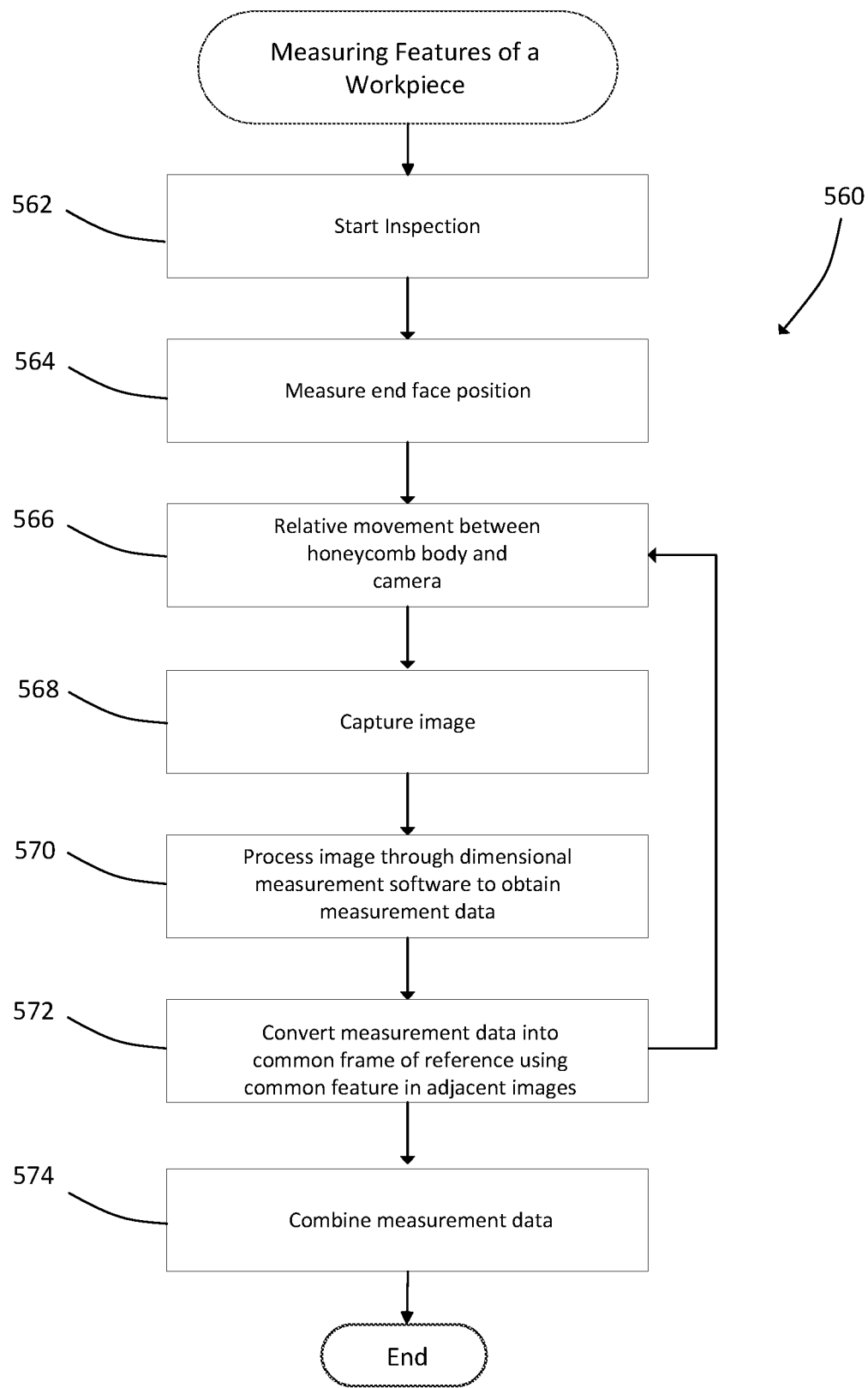
FIG. 7 depicts a flowchart of an example method of measuring features of a workpiece, such as a honeycomb body, in accordance with embodiments disclosed herein.

FIG. 7 depicts a flowchart 560 for measuring features of a workpiece, such as the honeycomb body 100. Since honeycomb extrusion dies have features corresponding to the features of honeycomb body 100 (e.g., slots of the extrusion die forming the walls 102 and pins of the extrusion die forming the channels 108), the imagining system 320 and method 560 can be utilized for inspecting the dimensions of the pins and slots of honeycomb extrusion dies, as both honeycomb bodies and honeycomb extrusion dies are workpieces having the herein described honeycomb patterns. For example, the image of FIG. 2 could also represent a honeycomb extrusion die with the reference numeral 108 identifying pins and the reference numeral 102 identifying slots formed between the pins. Flowchart 560 can be performed using the imaging system 320 shown in FIG. 3 and as described with respect to FIGS. 4, 5A-5C, and 6A-6C. Further structural and operational embodiments will be apparent to persons skilled in the relevant art(s) based on the discussion regarding the flowchart 560.

As shown in FIG. 7, the method of flowchart 560 begins at step 562. In step 562, inspection of a workpiece (e.g., the honeycomb body 100) is started by loading the workpiece into an imaging system (e.g., the imaging system 320). For example, the honeycomb body 100 can be loaded onto the part holder 330.

At step 564, the location of the workpiece is determined. In particular, the location of the honeycomb body 100 is determined relative to the imaging system 320. In an example embodiment, the location of the honeycomb body 100 is determined by measuring the distance between the lens 324 and the honeycomb body 100. The distance can be measured using the distance sensor 340 of imaging system 320. The distance can be measured at a plurality of locations on the workpiece so that the angle of the end face of the workpiece relative to the optical axis of the lens 324 can be determined.

At step 566, the workpiece is positioned relative to the camera (e.g., the camera 322 and/or its lens 324) to provide desired alignment and positioning for imaging a portion of the workpiece. In an example, the honeycomb body 100 is positioned relative to the lens 324, by translating it in an XY plane and by tilting it around the X-axis and/or Y-axis, so that a desired portion of the honeycomb body 100 is disposed in the field of view of the camera 322 and lens 324. The honeycomb body 100 can be tilted so that the end face is normal to the optical axis of the lens 324 to improve imaging. The movement in the XY plane can correspond with the positions in the grid pattern illustrated in FIG. 4. The honeycomb body 100 can be positioned relative to the lens 324 using any combination of movable stages, such as a movable stage 334 for the camera 322 and lens 324 and/or the movable stage 336. The movable stages are selected so that the accuracy and repeatability of the relative position between the honeycomb body and the imaging system 320 is known within a predefined tolerance. As an example, the accuracy of the movable stage is selected so that a location of common features shown in adjacent images is known within a tolerance of half of a cell width. In another example embodiment, the accuracy of the movable stage is selected so that a location of common features shown in adjacent images is known within a 20 pixel tolerance. In this way, even if there is some error in movement, such that a feature is not exactly where expected, this feature can be still be identified since it is within a small degree of tolerance.

Step 566 can also comprise setting the relative Z-axis position between the workpiece and the imaging system to a distance that places the workpiece within the depth of field of the imaging system. In an example embodiment, the camera 322 and lens 324 are translated in a direction parallel to the Z-axis relative to the honeycomb body 100 by the movable stage 334. That movement places an end face of the honeycomb body 100 in the depth of field of the lens 324 so that a portion of the honeycomb body 100 is in focus. The combination of movements provided in steps 566 and 568 effectively provide auto-levelling and auto-focus of the workpiece in the imaging system.

At step 568, an image is captured. For example, the honeycomb body is illuminated and an image of at least a portion of the workpiece is captured. In an example embodiment, a processor (e.g., comprised by the controller 332) determines that the honeycomb body is positioned in a desired position in the grid (e.g., has desired X- and/or Y-coordinates or indexes), directs the first and second light sources to illuminate the workpiece, and/or directs that camera 322 to capture an image of the honeycomb body 100.

At step 570, features of the workpiece are measured by analyzing the captured image. In other words, measurement data related to dimensions of features of the honeycomb body 100, such as dimensions of the walls 102 and/or channels 108, are extracted from the captured image. The image is used to identify the type, location, and dimensions of features of the honeycomb body 100. Measurement data corresponding to the features of the honeycomb body 100 is compiled for each image. In an example embodiment, the honeycomb body 100 and imaging system 320 are stepped through the positions in the grid pattern, such as the grid pattern shown in FIG. 4, and an image is captured at each position and analyzed.

At step 572, the measurement data is converted into a common frame of reference using a common feature in an overlapping region between each adjacent pair of images so that the measurement data can be combined into a single measurement data set at step 574. In this way, the combined measurement data set corresponds to the entire workpiece despite the measurement data being extracted from a plurality of images having different frames of reference. In an example embodiment, the measurement data can be normalized so that all of the measurement data corresponds to a single coordinate system and the normalized measurement data can be converted into a single frame of reference and combined together. In example embodiments, an image of the plurality of images can be selected to define a frame of reference that is used as a common frame of reference for all of the measurement data. Alternatively, a global frame of reference that is different than any frame of reference from the plurality of images can be used as a common frame of reference for all of the measurement data. Measurement data from adjacent images is collected, including measurement data applying to common features captured in the adjacent images. The common features permit measurement data taken from a plurality of images to be converted into the common frame of reference so that all of the measurement data can be combined into a single measurement data set.

The common features can be one or more features of the honeycomb body 100 that are captured in both images. The common features can be corner posts of a single cell, the centroid of a cell, centroids of a plurality of cells, etc., that are shown in an overlapping region between two images. The common feature can be measurements of a geometric imperfection, such as a bent wall, a discontinuous wall, a wall thickness anomaly, or another wall imperfection. Based on the common feature, a spatial relationship, such as a relative offset in X- and/or Y directions, between the images can be determined and can be used to convert measurement data from the reference frame of any image into the common frame of reference so that all of the measurements can be combined together into a single measurement data set based on the common frame of reference.

The identification of the common features can also be used to determine error in the positioning of the images relative to each other based on a predefined expected offset distance. For example, a measured location of a common feature in an image can be compared to an expected location of the common feature in that image based on a predefined expected offset to define an error in relative movement between the honeycomb body 100 and the imaging system 320 between capturing images. The predefined expected offset distance combined with any error can be used to define a spatial relationship between the images corresponding to a spatial relationship between the first frame of reference and the second frame of reference.

Additionally, a dimension between a plurality of common features in adjacent images can be used to determine an error, such as a scaling error. For example, the same dimension can be measured in each of the adjacent images to provide a first reference dimension and a second reference dimension. The measured values for the dimension are compared to determine if there is an error between the adjacent images, such as a scaling error. If there is no error, the first reference dimension and the second reference dimension are the same. However, if there is imaging error present, the reference dimensions will differ, and the difference can be used to define a transformation. The transformation can be applied to the measurement data to create converted measurement data that is normalized to the common frame of reference.

In an example embodiment, each image is analyzed to extract measurement data prior to moving to the next position, so that steps 566, 568, 570, and 572 are repeated until the entire end face of the honeycomb body 100 is imaged and analyzed for measurement data. However, steps 570 and/or 572 need not occur immediately after step 568 for each image, but can instead the images and/or extracted measurement data can be saved (e.g., to data storage in the controller 332) and analyzed at a later time.

At step 574, the measurement data is combined together (e.g., via the controller 332). As discussed herein, the measurement data generated from each of the plurality of images is combined directly instead of creating a composite image and extracting the measurements from the composite image.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An imaging system for measuring dimensions of a workpiece comprising a honeycomb body or a honeycomb extrusion die comprising:
    a camera configured to capture images of the workpiece;
    an actuator configured to move the camera relative to the workpiece or the workpiece relative to the camera;
    a processor in data communication with the camera and the actuator and configured to cause the imaging system to:
        capture a first image of a first portion of the workpiece with the camera, wherein the first image defines a frame of reference;
        determine a first plurality of measurements based at least in part on the first image of the first portion of the workpiece;
        position a field of view of the camera with respect to a second portion of the workpiece with the actuator, wherein the second portion and the first portion comprise a plurality of common features, and wherein the second portion comprises at least one feature that is not included in the first portion;
        capture a second image of the second portion of the workpiece;
        determine a second plurality of measurements based at least in part on the image of the second portion of the workpiece, wherein the first and second pluralities of measurements correspond to dimensions of intersecting walls of the honeycomb body or of intersecting slots of the honeycomb extrusion die, wherein at least one of the first plurality of measurements is a first reference dimension defined by the common features, wherein at least one of the second plurality of measurements is a second reference dimension defined by the common features, wherein the first reference dimension is defined by a dimension between the common features based at least in part on the image of the first portion of the workpiece and the second reference dimension is defined by the same dimension between the common features based at least in part on the image of the second portion of the workpiece;
        compare the first reference dimension to the second reference dimension to calculate a transformation;
        apply the transformation to the second plurality of measurements to convert the second plurality of measurements into the frame of reference; and
        combine the first plurality of measurements and the converted second plurality of measurements.

2. The imaging system of claim 1, wherein a distance between a first centroid of a first cell of the honeycomb body and a second centroid of a second cell of the honeycomb body extracted from the first image defines the first reference dimension and wherein a distance between the first centroid and the second centroid extracted from the second image defines the second reference dimension.

3. The imaging system of claim 1, wherein the processor is further configured to cause the imaging system to compare the first reference dimension to the second reference dimension to calculate a scaling error.

4. The imaging system of claim 1, wherein the processor is further configured to cause the workpiece and the imaging system to move relative to each other to image the different portions of the workpiece.

5. The imaging system of claim 1, wherein the processor is further configured to cause the imaging system to extract the measurements from the images using machine vision software.

6. The imaging system of claim 1, further comprising a lens, a first light source, and a second light source.

7. The imaging system of claim 6, wherein the first light source is configured to provide bright field lighting and the second light source is configured to provide dark field lighting.

8. The imaging system of claim 6, wherein the lens defines an optical axis, the first light source defines a first illumination axis, and the second light source defines a second illumination axis, wherein the first illumination axis is angled relative to the optical axis by a first angle that is in a range between 0° and 20°, and the second illumination axis is angled relative to the optical axis by a second angle that is in a range between 70° and 90°.

9. The imaging system of claim 6, wherein the workpiece is illuminated by the first light source and the second light source simultaneously while capturing the first image and the second image.

10. The imaging system of claim 1, wherein the workpiece is stationary relative to the camera while capturing the first image and the second image.

* * * * *